United States Patent [19]

Dell

[11] Patent Number: 5,450,422

[45] Date of Patent: * Sep. 12, 1995

[54] METHOD AND STRUCTURE FOR PROVIDING ERROR CORRECTION CODE FOR EACH BYTE ON SIMM'S

[75] Inventor: Timothy J. Dell, Colchester, Vt.

[73] Assignee: International Business Machines Corporation, Armonk, N.Y.

[*] Notice: The portion of the term of this patent subsequent to Jan. 3, 2012 has been disclaimed.

[21] Appl. No.: 188,245

[22] Filed: Jan. 28, 1994

[51] Int. Cl.⁶ ............................................. G06F 11/10
[52] U.S. Cl. ................................................. 371/40.1
[58] Field of Search ............... 371/37.3, 37.7, 40.1, 371/40.4, 49.3, 49.1, 51.1

[56] References Cited

U.S. PATENT DOCUMENTS

| | | |
|---|---|---|
| 4,850,892 | 7/1989 | Clayton et al. |
| 5,058,115 | 10/1991 | Blake et al. ............... 371/40.1 |
| 5,070,450 | 12/1991 | Holman, Jr. et al. |
| 5,127,014 | 6/1992 | Raynham ............... 371/37.3 |
| 5,235,602 | 8/1993 | Klim ............... 371/49.3 |
| 5,241,643 | 8/1993 | Durkin et al. |
| 5,287,364 | 2/1994 | Kimura ............... 371/40.4 |

FOREIGN PATENT DOCUMENTS 1-208799  8/1989  Japan .................. 371/40.4

Primary Examiner—Roy N. Envall, Jr.
Assistant Examiner—Steven R. Garland
Attorney, Agent, or Firm—Calfee, Halter & Griswold

[57] ABSTRACT

A SIMM is provided which adds ECC onto a computer system which system does not have ECC capabilities. The SIMM has ECC on board, and does ECC on each byte of a data word, Thus, individual bytes of multiple data words can be written without the need for read-modify-write cycles. Hence, additional or dynamically changeable wait states need not be present in the system. Therefore, the SIMM is usable on a great number of different computer systems without modification.

15 Claims, 3 Drawing Sheets

METHOD AND STRUCTURE FOR PROVIDING ERROR CORRECTION CODE FOR EACH BYTE ON SIMM'S

RELATED APPLICATION

Patent application Ser. No. 08/187,859, filed Jan. 28, 1994, now U.S. Pat. No. 5,379,304, entitled "Method and Structure for Providing Error Correction Code and Parity for Each Byte on SIMM's".

FIELD OF THE INVENTION

This invention relates generally to error correction code on single inline memory modules (SIMMs) which can be used in computer systems, which systems do not themselves have error correction code. More particularly, this invention relates to providing error correction code on each byte of a data word written to a SIMM as a part of a multiple byte data Word or as a single-byte data word and which SIMMs can be used on computer systems which do not have or cannot change dynamically their wait states.

BACKGROUND OF THE INVENTION

The integrity requirements for personal computer systems have grown rapidly in the past few years. At the present time, newer operating systems and applications require a great deal of memory, and the amount of memory which can be accommodated in personal computer systems continues to increase rapidly. Such personal computer systems have in the past typically been provided only with the capability of writing and checking parity—if even that. In such a case of parity, if an odd number of bits of memory is corrupted, the bad parity condition will be flagged, and generally the system will halt when the error is detected. This poses a significant problem since users can ill afford to have periodic system crashes and/or loss of data, and as the amount of memory increases, the possibility of such data corruption increases significantly. In the case of systems which do not write and check parity, corrupted data can cause malfunction of the system. Moreover, with the advent of large applications which normally require large amounts of memory, these are the most exposed to such a crash and data corruption.

As indicated above, until very recently most conventional current low end personal computer systems contained at best only parity SIMMs which can detect single bit errors, but cannot correct such errors. Moreover, a parity function may not detect double or other multiple-bit errors.

One solution which has been proposed to eliminate system crash or corruption of data due to single-bit errors is to provide error correction code for use in computer systems which do not have error correction code capabilities internal thereto. Typically, this error correction code allows for the detection of most double-bit errors and the correction of all single-bit errors. These schemes are a significant improvement over purely parity SIMMs. One technique for utilizing ECC is the so-called 32/7-bit ECC algorithm. This ECC algorithm requires 7 check bits for each double word (i.e., 4 bytes or 32 bits, thus the designation 32/7). This results in a 39-bit wide memory SIMM required for each double word and associated 7-check bits (32 data bits+check bits). Thus, the widely-used 36-bit wide memory SIMM is not available to be used, although this is a conventional and popular size SIMM and is used with double words containing only parity bits which requires only 36 bits (32 data bits plus 4 parity bits). More importantly, many systems do not have wait states programmed either in the system or in the bus interface circuit, and thus read-modify-write (RMW) operations cannot be performed because of the additional time required from RMW. RMW is required when less than all of the bytes of a multiple data byte word are being written. For example, if only one byte of a four-byte data word is being rewritten, a RMW cycle must be performed to recalculate and generate new check bits or the check bits associated with the entire 32 bits of data will be in error.

Thus, in the case of systems configured to write less than all the bytes of a multiple byte data word (which is typical) and where ECC has been attempted, the systems or at least the interface circuit has to be modified to provide for the necessary delays to perform a RMW cycle when the ECC algorithm uses all of the data bits and generate check bits such as in the 32/7 bit ECC algorithm.

Thus, it is an object of the present invention to provide an improved ECC on SIMM which allows writing of single byte words and which SIMMs are compatible with systems which do not have wait states necessary for RWM cycles.

SUMMARY OF THE INVENTION

According to the present invention, a SIMM and method of operating the SIMM are provided wherein the SIMM has error correction code on board and is compatible with computer systems not having error correction code and which computer systems write single bytes of multiple byte words and do not have wait states necessary to perform read-modify-write operations when writing less than all of the bytes of a multiple byte data word. The error correction code logic and circuitry on the SIMM is configured to write a 4-bit error correction code for each byte of a data word that is written and to read the stored data bytes and check bits and correct all single-bit errors and detect some multi-bit errors, or detect all two-bit errors but not correct single-bit errors, but not both. The error correction code circuitry and logic is configured to perform the required function without requiring a delay state and thus without a RMW cycle. This is accomplished by utilizing a DRAM on the SIMM that operates faster than the total read or total write operation of the SIMM according to JEDEC or other standards. By using a fast DRAM, the late write feature on the DRAM can be employed on the write cycle to write check bits before good data is latched into the register; on the read cycle, the fast DRAM is used to read the data bits, generate new check bits and syndrome bits, and correct all one-bit errors before the corrected data is placed on the system bus of the computer system. Thus, every byte has check bits written to that specific byte, and error checking and correction takes place on each byte read from memory, all within the time constraints of a standard JEDEC SIMM and without the necessity for read-modify-write cycles in the computer system or interface chip.

DESCRIPTION OF THE PREFERRED EMBODIMENT

The preferred embodiment will be described in the environment of an IBM Personal Computer using an Intel 80386 or 80486 microprocessor and with single in-line memory (SIMMs) having dynamic random access memory (DRAM) chips to provide and control the memory function. (A SIMM is sometimes referred to as a DRAM card which means the DRAM and all chips and circuits on the SIMM.) For the purpose of this description, the system will be described as it is used with a CPU capable of generating parity bits for the data bytes that it writes and also reading and comparing parity information read from storage. The CPU and its associated system will not have error correction code logic contained within the CPU system.

Figure 1:
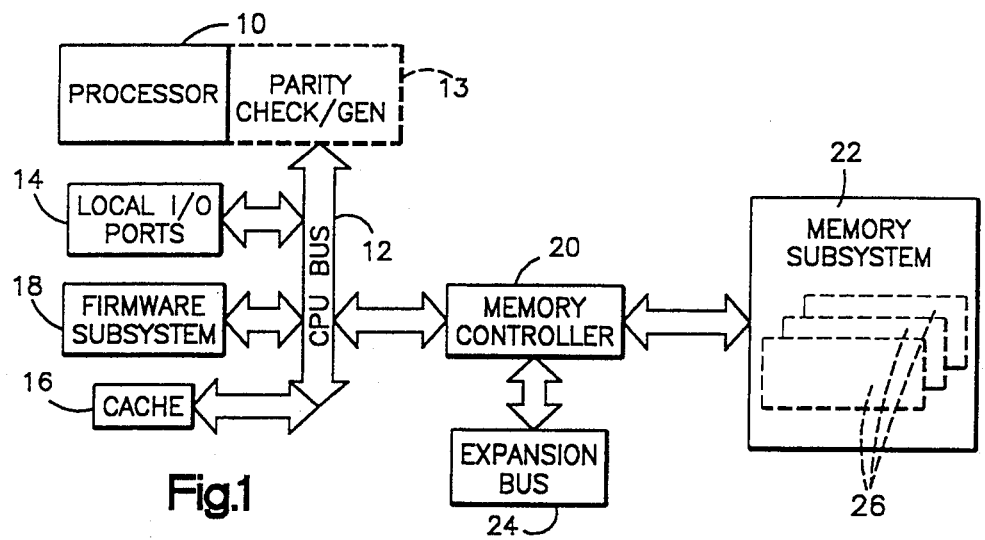
FIG. 1 is a high-level diagram showing the interconnects of a personal computer with a bus and an add-on memory cards according to this invention.

As can be seen in FIG. 1, there is provided a CPU 10 which is connected to a CPU or system bus 12. A parity generation and check unit 13 preferably is provided which also generates or checks parity of data being either written by or read by the CPU 10 to or from the bus 12. However, generation of parity bits is not essential to the functioning of this invention. The CPU bus 12 may also have local I/O ports 14, CACHE memory 16, and firmware subsystems 18 associated therewith. A memory controller 20 is also connected to the system bus 12, coupling it to a memory subsystem 22, and also normally to an expansion bus 24 if one is present. The memory subsystem 22 is typically comprised of one or more SIMMs 26, each of which is provided with DRAM chips and ASIC chips having error correction code. It is to be understood that the system just described is illustrative of systems on which the present invention can be used since one feature or aspect of the present invention is the provision of a SIMM card having ECC which can be utilized on virtually any system CPU and system having the capacity of receiving non-ECC SIMMs as add-on memory.

Figure 2:
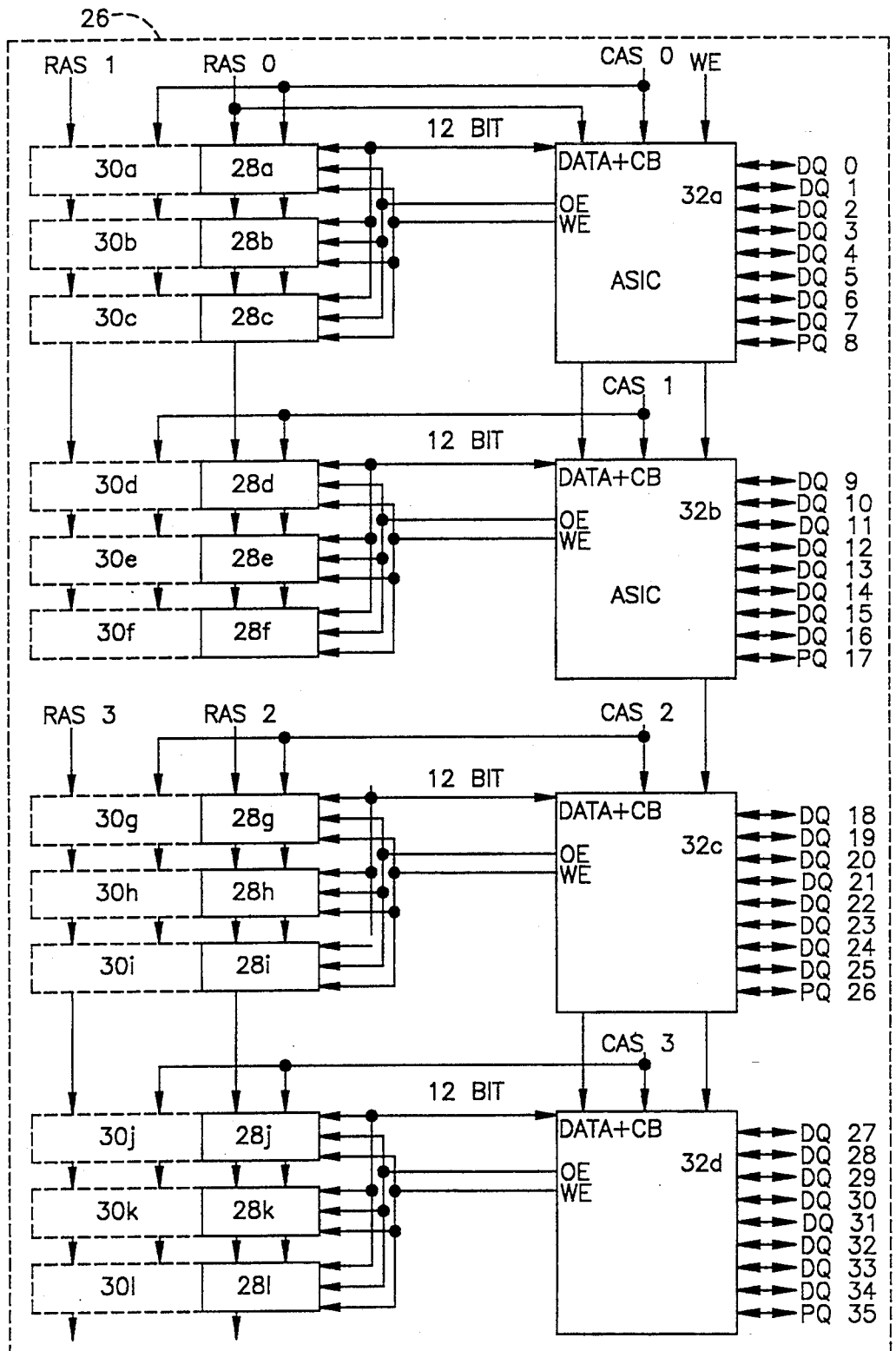
FIG. 2 is a high-level schematic representation of a SIMM card with ECC capabilities according to this invention connected to a computer system bus.

As indicated above, the CPU 10 is capable of writing data onto the bus 12 which in turn will be conveyed to the correct memory address in subsystem 22 by the memory controller 20. Upon writing data by the CPU 10, parity bits are generated for each byte of information written to memory by the parity generating and checking device 13 which also checks parity on information read from the memory subsystem 22 during a read cycle to determine parity error. The memory controller also provides the necessary signals, such as Row Activation Strobe (RAS), Column Activation Strobe (CAS), Write Enable (WE), and on some systems Output Enable (OE), and Byte Select (BS), etc., to the memory subsystem 22. The memory controller reads and writes both data and parity to each of the SIMMs 26, also as shown in FIG. 2. It should be understood that this invention is applicable to a wide variety of SIMMs having many different form factors. For example, it can be used in conjunction with the following SIMM forms: 72 pin×32; 72 pin×36; 168 pin×64; 168 pin×72; 88 pin DRAM card; 68 pin DRAM card; 68 pin PCMCIA card, and 72 pin small outline DRAM card.

The logic will also regenerate parity bits for each byte fetched on a read cycle.

Referring now to FIG. 2, a 72 pin SIMM 26 constructed according to this invention is shown. The SIMM 26 has a plurality of DRAMs 28a–28l. These are conventional 1M×4 DRAM chips which are commercially available. The 1M×4 DRAMs have 4 data I/O pins (DQ 1–4) and $2^{20}$ addresses. Thus, each series of 3 DRAM chips can receive 12 data bits, i.e., 28a, 28b, 28c can each receive a 4-bit wide data field, and thus together have a 12-bit wide bus. DRAM 28d, 28e and 28f also each are 1M×4 and together form a 12-bit wide data bus. The same is true for DRAMs 28g–28i, and DRAM 28j–28l. These type of DRAMs used on SIMMs are conventional for add-on memory modules and need not be described further. Other DRAMs such as 256K×4; 4M×4; 16M×4, etc., can also be used. If desired, the DRAMs can be formed in a stacked configuration as shown in dotted lines, thus having a second DRAM chip 30a–30l, each stacked respectively on the corresponding DRAM chip 28a–28l. This configuration as shown in dotted lines does in fact provide a more dense memory if desired.

Also provided on the SIMM are 4 ASIC (application specific integrated circuit) chips 32a, 32b, 32c and 32d. As can be seen in FIG. 2, various lines coming from the memory controller 20 bring the various signals such as RAS, CAS and WE. Also, a bus between the SIMM 28 and the memory controller 20 provides for interchange of data between the SIMM 26 and CPU 10. In this particular format, a 36-bit wide bus is used which delivers 8 data bits and 1 parity bit to each ASIC chip 32a, 32b, 32c and 32d. The ASIC chips 32a–32d provide, among other things, the logic needed to perform the read and write functions of the data to the DRAMs 26a–26l, and in so doing generate check bits, the check bits being generated such that there are 4 check bits generated for each byte of data. Each data byte (8 bits) together with the generated 4 check bits from the ASIC chip 32a are stored in DRAMs 28a, 28b and 28c, four bits in each DRAM for a total of 12 bits, i.e., a single byte plus 4 check bits. The same is true for ASIC chips 32b, 32c and 32d with respect to DRAM 28d–28f, 28g–28i, and 28j–28l, respectively. Thus, it will be appreciated that the arrangement and configuration of the SIMM 26 as shown allows a 4-byte data word to be written and the ECC check bits generated individually for each byte and each byte with its associated check bits stand individually. Therefore, if during any write cycle less than the entire four byte data word is being written or rewritten, this can be done without doing a read-modify-write cycle which would be required if all of the data bytes participated in writing all of the check bits such as is common in the 32/7 algorithm. Hence, a wait state need not be programmed into the computer system, including the processor or memory controller, but rather during each write operation check bits are generated, and during each read operation check bits are regenerated as syndrome bits and error correction made on each byte individually on each read operation.

The logic and generation of the bits will be described with respect to the ASIC chip 32a, in combination with the DRAM chips 28a, 28b and 28c. It is to be understood that the same operations take place with respect to the ASIC chip 32b and the DRAMs 28d, 28e and 28f, ASIC chip 32c in combination with DRAMs 28g, 28h and 28i, and ASIC chip 32d in combination with DRAMs, 28j, 28k and 28l. Thus, each ASIC receives 8 bits of data plus 1 parity bit on the 36-bit bus, and included in the logic of each ASIC chip 32 the circuitry generates 4 check bits from the 8 data bits supplied thereto with the check bits being generated specifically with the data bits only of 1 byte of data.

Figure 3:
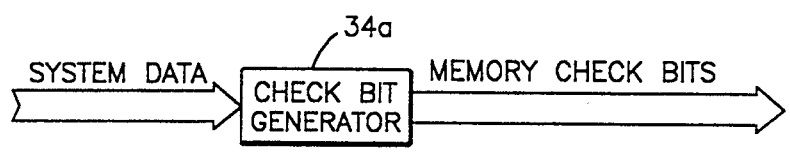
FIG. 3 is a block diagram showing the generation of check bits according to this invention.

The circuitry for generating check bits is shown in FIG. 3. The data bits DQ0 through DQ7 and parity bit PQ8 are received by ASIC chip 32a. The check bits are supplied together with the 8 memory data bits to a 12-bit bus line 36a, and the data bits are then stored in the DRAMs 28a, 28b, 28c. As indicated above, each DRAM is 1M×4 so that 4 of the data bits are stored in DRAM 28a, 4 data bits are stored in DRAM 28b and the 4 check bits in DRAM 28c. The error correction algorithm is shown in Table I below. In this table, the data bits which participate in generating each check bit are shown and marked with an "X".

TABLE I

| Data Bit    | 7 | 6 | 5 | 4 | 3 | 2 | 1 | 0 |
|-------------|---|---|---|---|---|---|---|---|
| Check Bit 0 |   | X |   | X | X |   | X | X |
| Check Bit 1 |   | X | X |   | X | X |   | X |
| Check Bit 2 | X |   |   |   | X | X | X |   |
| Check Bit 3 | X | X | X | X |   |   |   |   |

Figure 4:
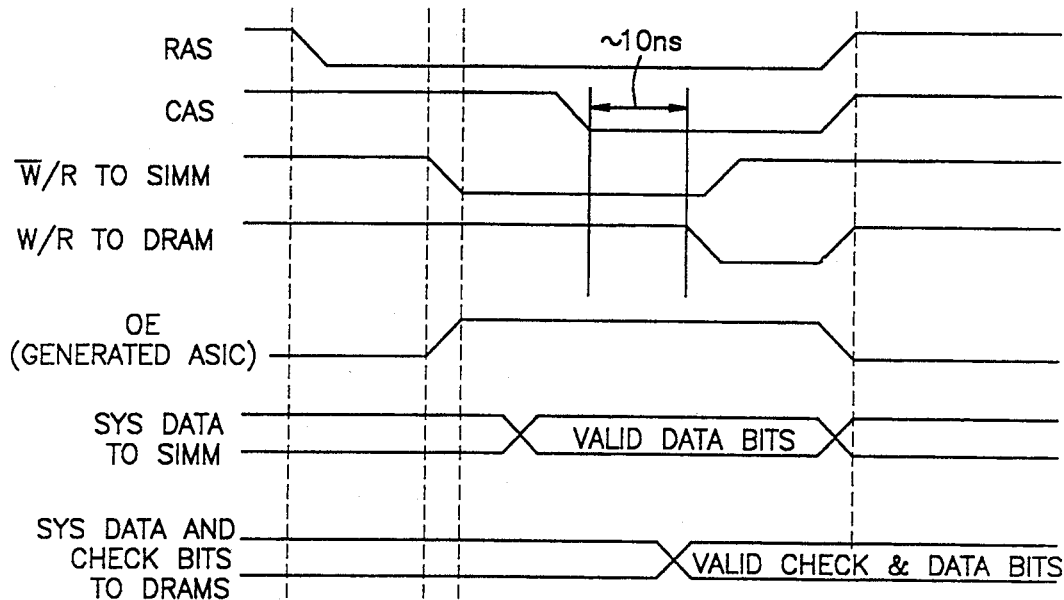
FIG. 4 is a timing diagram of certain signals used on the write cycle.

The timing for generating and storing the check bits together with the data bits is crucial and can best be understood by reference to the timing diagram shown in FIG. 4. In FIG. 4, the timing diagram shows the RAS, CAS, W/R to SIMM, W/R DRAM, OE, the system data to SIMM and system data and check bits to the DRAMs. W/R to SIMM is the signal from the memory controller to the SIMM and the W/R to DRAM is the "late" write enable signal to the DRAM. In order for the error correction code to operate within a single write operation cycle of the SIMM without requiring wait states and to be able to read the check bits, generate syndrome bits and correct data, it is necessary that the DRAMs 28a–28l operate at a faster speed than the operating speed of the SIMM itself. SIMM architecture standards are, in general, governed by JEDEC (Joint Electronic Device Engineering Council) standards. Industry standards for timing are based on the JEDEC architecture standards. According to one conventional industry standard, either a read operation or a write operation based on the timing of the signals must be completed within 70 nanoseconds. However, the JEDEC industry standards do not presuppose error correction taking place, and thus in order to stay within this parameter, it is necessary to perform the error correction function within the time limit normally allocated to merely read and write and perhaps check parity. To accomplish this, DRAM chips are selected which have a faster operating speed than the speed of the SIMM by at least about 10 nanoseconds. Thus, for a SIMM which has an operating time or parameter of 70 nanoseconds for a read operation or write operation, the DRAM must operate at about 60 nanoseconds or faster.

Referring now to FIG. 4, after RAS goes low followed by the W/R to SIMM going low when CAS goes low valid data will appear on the bus from the memory controller 20 to memory subsystem 22. To assure a read cycle does not occur, the OE signal from ASIC chip 32a is used to tristate the DRAM I/O's before the W/R to SIMM goes low. However, this data cannot be latched into memory until the check bits are generated, which requires a certain finite amount of time. Thus, to this end, as indicated above, the late write cycle on the DRAM is used. This is done by maintaining the W/R to DRAM line high for about 10 nanoseconds after CAS has gone low. During this 10 nanoseconds, check bits are being written. At the end of these 10 nanoseconds when the W/R to DRAM goes low, both the data bits and the check bits are latched into DRAMs 28a, 28b, 28c as indicated before. This is shown in the system data-to-SIMM and system data-to-DRAM lines wherein it is shown that valid data write takes place when the CAS goes low, but the valid data and check bits do not appear until the write to DRAM line has gone low. These data bits and check bits are latched in DRAMs 28a–28c.

Figure 5:
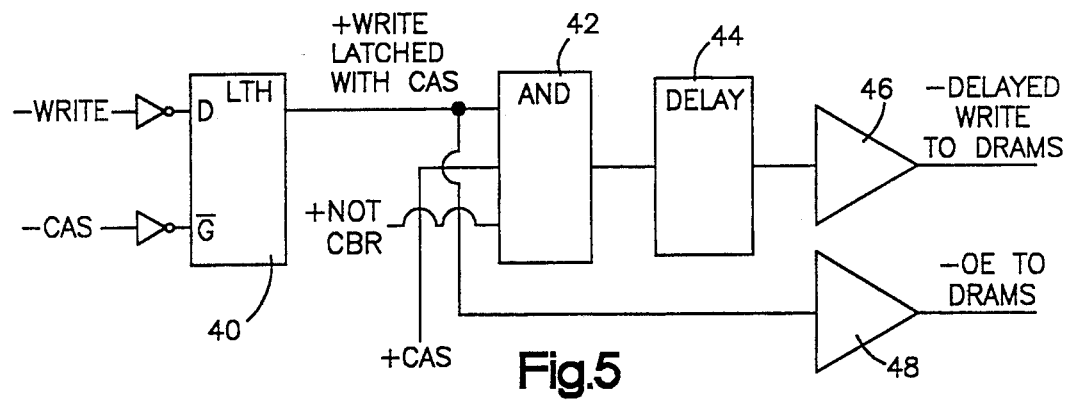
FIG. 5 is a block diagram of the components to do a late write function.

The logic to perform this is shown in FIG. 5, wherein the W/R to SIMM line and the CAS lines are shown going to a latch 40. The output from the latch 40 is supplied as a +write latched together with CAS to an AND gate 42, the output of which is supplied to a delay block 44 and thence to a driver 46 the output of which is the delayed write to DRAM. Also, inputs to the AND gate are a +not CBR (CAS before RAS) and also a +CAS input. The +write latched with CAS is also supplied to a second driver 48 so as to provide an OE signal to the DRAM.

The reason for and functioning of this circuit are as follows. Typically, the W/R to SIMM must be valid and often only is valid before CAS falls and then held for about a maximum of 15 ns after CAS falls. A straight delay on W/R to SIMM would not be wide enough to write data. Hence, this is written to the latch 40, and when CAS falls, the latch samples the signal on W/R to SIMM line. The latch 40 maintains the data valid as long as CAS stays low.

The latch 40 is transparent, so what is impressed on the input of the latch 40 appears at the output which is a write enable as CAS goes low, and will stay as an output as long as CAS is low. In this state, the data flows through the latch 40 and thus the need for the delay. The AND gate 42 operates to block signals before CAS becomes active. The delay block 44 provides the necessary time to generate the check bits before the data is latched into memory. The time of delay is less than 20 ns, typically 7–9 ns. The +CAS and not CBR (CAS before RAS) signals are impressed on the input of the AND gate 42 so that data will not be written on a refresh cycle if CAS is low during a refresh mode done as CBR. Thus, by utilizing the late write function of the DRAMs together with a DRAM that is faster than the speed of the SIMM, an 8-bit data byte can be written and check bits generated in the normal write operation of the SIMM.

Figure 7:
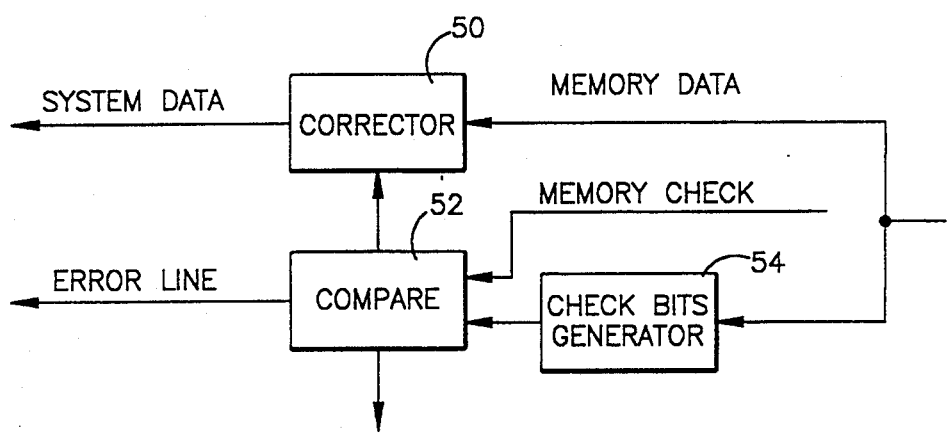
FIG. 7 is a block diagram showing the regeneration of check bits, generating syndrome bits, and correcting single-bit errors and delay some multibit errors according to this invention.

The data when read on a read operation goes through logic which generates new check bits, compares the newly-generated check bits with the stored check bits and then writes a syndrome table which is the well-known manner of error correction of single-bit errors and detection of some multi-bit errors. This also has to be done within the time standard set for the SIMM card. Once again, there is a need for the fast DRAM, the DRAM being at least 10 nanoseconds faster than the SIMM. The circuitry for the error correction code is shown in FIG. 7 wherein the 8 bits of memory data constituting a data byte are read from memory to a corrector 50. At the same time, the 4 stored check bits that have been stored with the 8 bits of data memory are impressed on a comparator 52. The 8 memory data bits are also impressed on a check bit generator 54 which regenerates the check bits based on the stored 8 bits of data. These regenerated check bits are also supplied to the comparator 52 where the originally-generated and stored check bits are compared with the newly-generated check bits to generate syndrome bits. The syndrome bit table and the errors which they indicate are shown in Table II below.

TABLE II

| Syndrome 3210 | Bit in Error | Action Toggle Data | Error Output |
|---|---|---|---|
| 0000 | None | N | N |
| 0001 | Check Bit 0 | N | Y |
| 0010 | Check Bit 1 | N | Y |
| 0011 | Data Bit 0 | Y | Y |
| 0100 | Check Bit 2 | N | Y |
| 0101 | Data Bit 1 | Y | Y |
| 0110 | Data Bit 2 | Y | Y |
| 0111 | Data Bit 3 | Y | Y |
| 1000 | Check Bit 3 | N | Y |
| 1001 | Data Bit 4 | Y | Y |
| 1010 | Data Bit 5 | Y | Y |
| 1011 | Data Bit 6 | Y | Y |
| 1100 | Data Bit 7 | Y | Y |
| 1101 | Multi Bit Error | N | Y |
| 1110 | Multi Bit Error | N | Y |
| 1111 | Multi Bit Error | N | Y |

Figure 6:
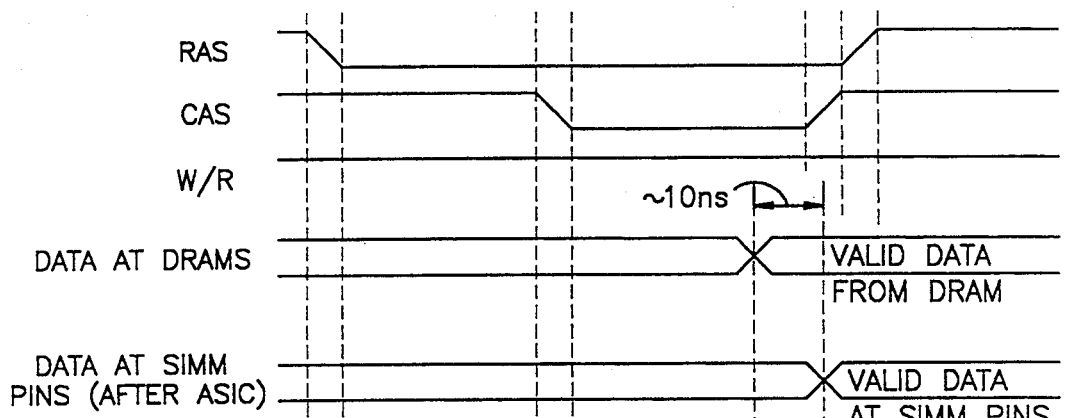
FIG. 6 is a timing diagram of the read cycle.

The syndrome bits are generated by XORing each newly generated check bit with the comparable stored check bit. If they are all "O"s, the syndrome bits as shown in the table will be 0000, which will indicate that there is no error. Single bit errors will show up as various syndrome bit patterns. It will be noted that all single-bit errors can be detected and hence corrected. Certain multi-bit errors can be detected which are shown in the syndrome table as syndrome 1101, 110 and 1111. These all indicate multi-bit, and hence uncorrectable, errors. (It should be noted that if desired a 4-bit ECC code for a single byte can be used to detect all two bit errors but not correct them-but it cannot both correct all single bit errors and detect all two bit errors.) The syndrome bits are impressed on the corrector 50 and if any bit needs to be corrected because of a single-bit error, that particular bit is "flipped". The corrected data is delivered out as system data in 8 bits out to the system bus. The signal diagram for this is shown in FIG. 6. When the RAS goes low followed by CAS going low and the W/R to SIMM being high, data is read from the DRAMs and because it can be read in 60 nanoseconds as shown on the RAS line, there is an additional 10 nanoseconds available for the generation of the additional check bits, the generation of the syndrome bits and error correction which is shown as the 10 nanosecond delay. After the specified CAS access time (TCAS), the data at the SIMM can be latched as corrected data and impressed on the bus to the memory controller 20.

Thus it can be seen that by providing DRAMs which can operate faster than the operation cycle time of the SIMM according the JEDEC or whatever other standard to which it has been manufactured, error correction can be performed on each byte of data independently. Hence, such a SIMM can be utilized in a wide variety of computer systems which do not have the wait states necessary to perform read-modify-write operations and which write multi-byte data words and which allows error correction to take place on the add-on SIMM even when the computer system is not configured to include error correction.

Again, it should be noted that the present invention is not limited to the particular SIMM as shown and described, but is applicable to SIMMs have various form factors. All that is required is that the DRAM on the SIMM be able to operate at least about 10 nanoseconds faster than the operating time of a read or write operation of the SIMM. The error correction function thus can be afforded to any system which writes one or more data bytes irrespective of the width or number of bytes in a data word. Of course, there is some penalty for utilizing 4 bits of error correction for each 8 bits of a data word; i.e., there is a somewhat increased amount of storage space necessary as opposed to utilizing a 32/7 or 64/8 algorithm of generating check bits. However, the advantage is that these SIMMs can be used in many systems, including those which do not have the necessary wait states for a read-modify-write and thus has wide applicability in retrofitting systems which do not have error correction code on board.

Also, it is to be understood that the invention can be performed generating more than 4 check bits; e.g., 5 check bits. In such a case, more types of errors can be detected and/or corrected. This would require additional memory space and logic for each check bit which could be supplied by additional ×1 DRAMs. At least 4 check bits are necessary to correct all single bit errors.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A SIMM memory adapted to be added as add-on memory to a computer system, which system writes eight-bit bytes of data and said SIMM provides error correction for said data; and wherein said SIMM is configured to operate at a given speed for read and write operations, comprising:

logic to generate at least four check bits from the eight bits of each data byte written; DRAM chips to store said generated four check bits with each data byte in said DRAM chips without introducing a wait state;

logic to read each data byte and associated check bits from the DRAM and generate new check bits and compare the newly-generated check bits with the stored check bits to correct and output all single-bit errors and detect some multi-bit errors in the read data, said DRAM chips being selected to operate at a speed of at least about 10 nanoseconds faster than the speed of operation of the SIMM; and said DRAM chip including logic to provide a late write function to the DRAM.

2. The invention as defined in claim 1, further characterized by delay logic to delay the writing of data to the DRAM chips during the write operation until the check bits are generated.

3. The invention as defined in claim 2, wherein said delay logic includes a delay block and a latch.

4. The invention as defined in claim 3 wherein said latch is configured to latch valid data until it has been written to the DRAM.

5. The invention as defined in claim 4 wherein said delay logic includes logic to permit writing data during a refresh cycle.

6. The invention as defined in claim 1 wherein said logic to read the data from the DRAM chips generates new check bits, and correct the single bit error and is configured to output the corrected data within less than 10 ns.

7. A computer system comprising:
a CPU and a bus having a SIMM memory added as add-on memory to said computer system, said computer system configured to write eight bit bytes of data, said SIMM including error correction for said data; said SIMM being configured to operate at a given speed for read and write operations,
said SIMM including:
logic to generate at least four check bits from the eight bits of each data byte written; DRAM chips to store said generated four check bits with each data byte in said SIMM without introducing a wait state;
logic to read each data byte and associated check bits from the DRAM and generate new check bits and compare the newly-generated check bits with the stored check bits to correct and output all single-bit errors and detect some multi-bit errors in the read data and supply said corrected data to the system bus,
said DRAM chips being selected to operate at a speed of at least about 10 nanoseconds faster than the speed of operation of the SIMM; and said DRAM chip including logic to provide a late write function to the DRAM.

8. The invention as defined in claim 7, further characterized by delay logic to delay the writing of data to the DRAM chips during the write operation until the check bits are generated.

9. The invention as defined in claim 8, wherein said delay logic includes a delay block and a latch.

10. The invention as defined in claim 9 wherein said latch is configured to latch valid data until it has been written to the DRAM.

11. The invention as defined in claim 10 wherein said delay logic includes logic to permit writing data during a refresh cycle.

12. The invention as defined in claim 7 wherein said logic to read the data from the DRAM chips generates new check bits, and correct the single bit error and is configured to output the corrected data within less than 10 ns.

13. A method of providing error correction on SIMM memory added as add-on memory to a computer system which system writes eight-bit bytes of data; and wherein said SIMM is configured to operate at a given speed for read and write operations, comprising the steps of:
generating on said SIMM at least four check bits from the eight bits of each data byte written; storing said generated four check bits with each data byte in DRAMs on said SIMM without introducing a wait state in the computer system;
reading each data byte and associated check bits from the DRAM and generating new check bits and comparing the newly-generated check bits with the stored check bits to correct and output all single-bit errors and detect some multi-bit errors in the read data;
selecting said DRAM chips to operate at a speed of at least about 10 nanoseconds faster than the speed of operation of the SIMM; said method including delaying the write function to the DRAM after valid data appears for a time sufficient to generate said check bits.

14. The invention as defined in claim 13, further characterized by latching the data during said generation of said check bits.

15. The invention as defined in claim 13 further characterized by preventing a write operation during refresh.

* * * * *